(12) United States Patent
Keeler et al.

(10) Patent No.: US 6,595,470 B2
(45) Date of Patent: Jul. 22, 2003

(54) DEPLOYABLE RADIATOR WITH FLEXIBLE LINE LOOP

(75) Inventors: Bryan V. Keeler, Orange, CA (US); Arthur Mathias Lehtinen, Trabuco Canyon, CA (US); Billy W. McGee, La Mirada, CA (US)

(73) Assignee: The Boeing Company, Chicago, IL (US)

( * ) Notice: Subject to any disclaimer, the term of this patent is extended or adjusted under 35 U.S.C. 154(b) by 5 days.

(21) Appl. No.: 10/002,498

(22) Filed: Nov. 2, 2001

(65) Prior Publication Data

US 2003/0085323 A1 May 8, 2003

(51) Int. Cl.[7] ................................................ B64G 1/46
(52) U.S. Cl. ......................... 244/163; 244/173; 165/41
(58) Field of Search .............................. 244/163, 159, 244/173, 158 R; 165/41, 42

(56) References Cited

U.S. PATENT DOCUMENTS

| | | | | |
|---|---|---|---|---|
| 4,815,525 A | | 3/1989 | Readman ..................... 165/41 |
| 5,027,892 A | | 7/1991 | Bannonn et al. .............. 165/41 |
| 5,117,901 A | * | 6/1992 | Cullimore ..................... 165/86 |
| 5,372,183 A | | 12/1994 | Stickberger ................... 165/41 |
| 5,732,765 A | | 3/1998 | Drolen et al. .................. 165/41 |
| 5,743,325 A | | 4/1998 | Esposto ........................ 165/41 |
| 5,787,969 A | | 8/1998 | Drolen et al. .................. 165/41 |
| 5,794,890 A | | 8/1998 | Jones, Jr. ..................... 165/41 |
| 5,806,800 A | * | 9/1998 | Caplin ..................... 244/158 R |
| 5,927,654 A | | 7/1999 | Foley et al. ................... 165/41 |
| 6,073,888 A | | 6/2000 | Gelon et al. ................... 165/41 |
| 6,196,501 B1 | * | 3/2001 | Hall et al. ................... 244/163 |
| 6,378,809 B1 | * | 4/2002 | Pon ............................ 244/173 |

* cited by examiner

Primary Examiner—J. Woodrow Eldred

(57) ABSTRACT

Radiator assembly (10) for use on a spacecraft (12) is provided including at least one radiator panel assembly (26) repeatably movable between a panel stowed position (28) and a panel deployed position (36), at least two flexible lines (40) in fluid communication with the at least one radiator panel assembly (26) and repeatably movable between a stowage loop (42) and a flattened deployed loop (44).

28 Claims, 4 Drawing Sheets

DEPLOYABLE RADIATOR WITH FLEXIBLE LINE LOOP

GOVERNMENT INTEREST

The invention described herein was made in the performance of work under NASA Contract No. NCC8-190 and is subject to the provisions of Section 305 of the National Aeronautics and Space Act of 1958 (72 Stat. 435: 42 U.S.C. 2457).

TECHNICAL FIELD

The present invention relates generally to a radiator system for use on spacecraft, and more particularly, to a radiator system utilizing flexible line loops for increased re-stowage characteristics.

BACKGROUND OF THE INVENTION

Spacecraft are often subjected to a variety of conditions in which thermal energy must be dissipated to insure proper operation. Thermal energy created by spacecraft components or absorbed from astrobodies is commonly dispersed by radiating the thermal energy into space. In order to facilitate such thermal dissipation, spacecraft are commonly fitted with radiator assemblies that are deployed once a suitable orbit has been achieved and are positioned to radiate thermal energy out into space. Often, the radiator assemblies are housed in a stowed position within the spacecraft during launch and positioning, and are only deployed once a proper orbit has been achieved.

Although the radiator assemblies in many known designs remain protectively stowed during launch and early orbit operations, they often become fixed into a deployed state once a proper orbit has been achieved. Although this single deployment scheme may have been well-suited for some traditional spacecraft concepts, present spacecraft design and application often requires a more flexible range of operations. Orbit modification, mission adaptability, and reusable spacecraft experiencing reentry all would benefit from the ability to restow the radiator assembly after initial deployment. The ability to have a multiple use restowable radiator design may be especially significant to modern developments such as reusable manned and unmanned spacecraft and space planes.

Instrumental in the designs of many deployable radiator systems has been the use of flexible hose lines to allow fluid communication between the heat acquisition systems and the radiator panels. Although many such designs have been suitable for single deployment purposes, they are often not easily adaptable to restowage and multiple deployment conditions. Some flexible lines, for example, provide for expansion of the line during deployment but may weaken when restowed and may not remain capable of providing high pressure line service. Similarly, serpentine lines extend easily in length for deployment but often fail to reshape themselves back into their serpentine shape for restowage. Finally, helically coiled lines can be used to provide the torque necessary for deployment, however, they often require undesirable torque in order to restow the radiator panels. The larger torque requirement for stowage often results in higher power and weight deployment systems that are incompatible with the low weight requirements of many spacecraft designs. Thus, the flexible line configurations utilized in present designs do not often provide the low torque, low weight, restowable characteristics desirable for modern spacecraft applications.

It would, therefore, be highly desirable to have a spacecraft radiator design utilizing a flexible line configuration adaptable to low cost, low weight, and reliable multiple deployment/multiple restowage applications.

SUMMARY OF THE INVENTION

It is, therefore, an object of the present invention to provide a restowable radiator assembly for use in a spacecraft having a restowable flexible line allowing for low torque deployment and restowage of the radiator assembly. It is a further object of the present invention to provide a radiator assembly for use in a spacecraft having a deployable/restowable flexible line capable of providing reliable, wide pressure flow range, and lightweight characteristics.

In accordance with the above and other objects of the present invention, a redeployable radiator assembly for use on a spacecraft is provided. The radiator assembly includes a radiator panel assembly repeatably movable between a panel stowed position and a panel deployed position. The radiator assembly further includes at least one flexible line pair providing fluid communication between the radiator panel assembly and the spacecraft. The flexible line pair is repeatably movable between the stowage loop configuration and a deployed flat loop configuration.

Other objects and features of the present invention will become apparent when viewed in light of the detailed description of the preferred embodiment when taken in conjunction with the attached drawings and appended claims.

DESCRIPTION OF THE PREFERRED EMBODIMENTS(S)

Figure 1:
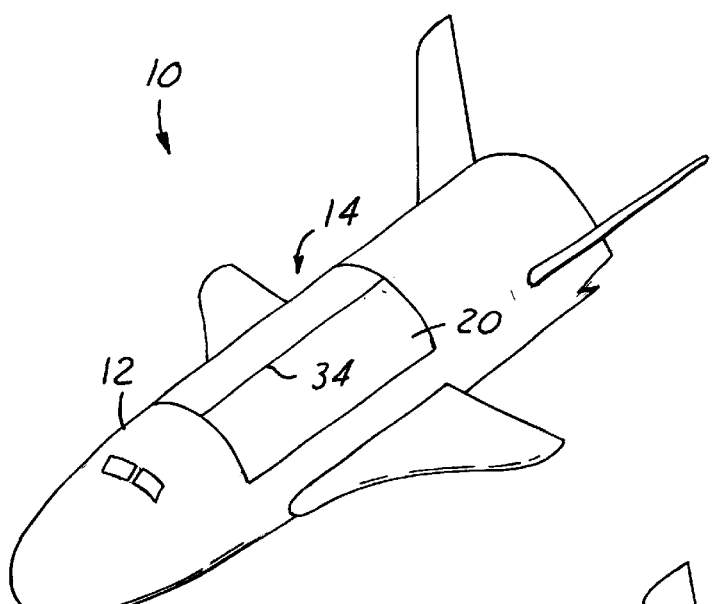
FIG. 1 is an illustration of an embodiment of a spacecraft in accordance with the present invention, the spacecraft illustrated with the radiators and protective doors in the stowed position.
Figure 2:
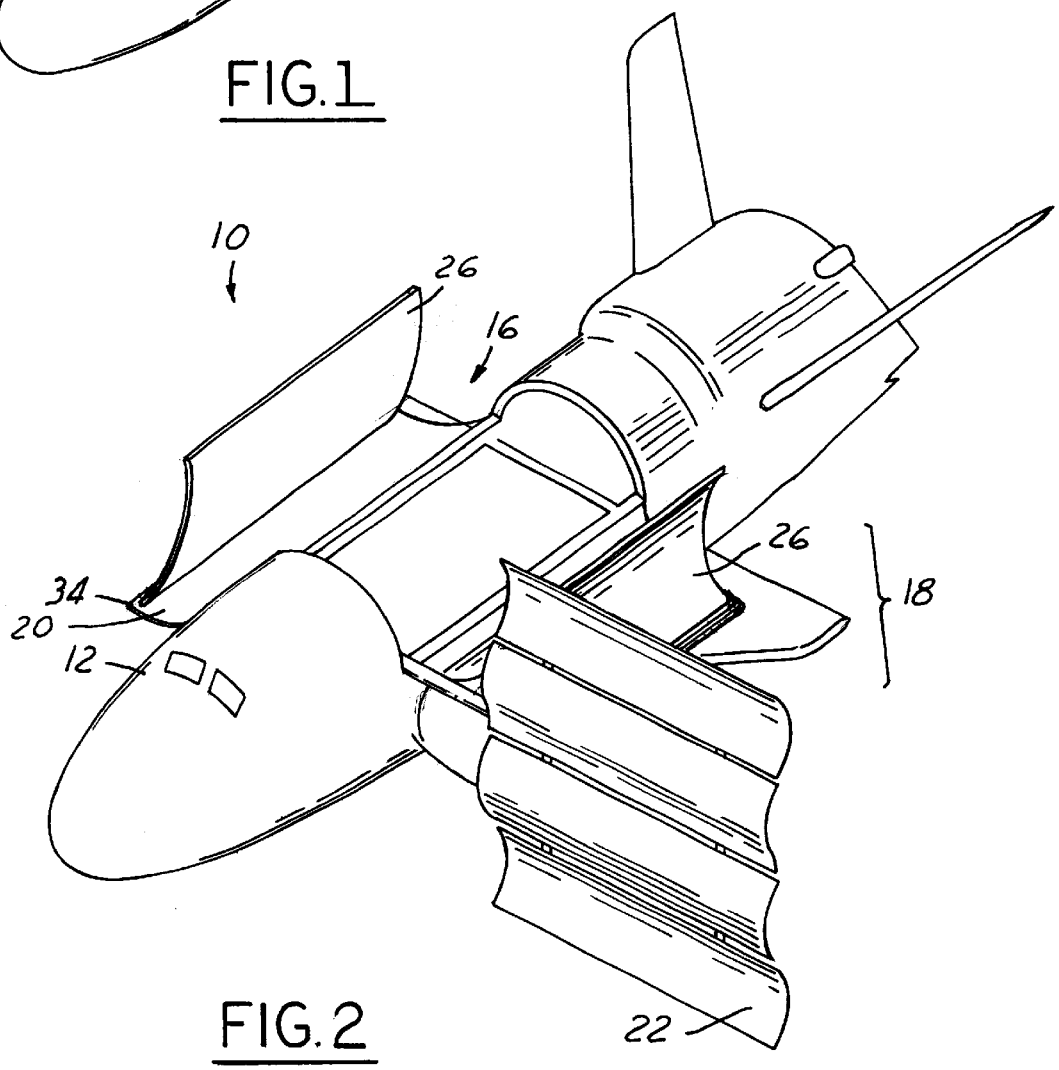
FIG. 2 is an illustration of an embodiment of a spacecraft in accordance with the present invention, the spacecraft illustrated with the radiators and protective doors in the deployed position.

Referring now to FIGS. 1 and 2, illustrating an embodiment of a re-stowable radiator assembly 10 for use on a spacecraft 12 in accordance with the present invention. Although the spacecraft 12 is illustrated in a configuration representative of an unmanned space vehicle or a space plane, it should be understood that the present invention may be utilized on a wide variety of spacecraft 12 that may be formed in a wide variety of configurations. The spacecraft 12 is movable between a stowed configuration 14 and a deployed configuration 16 illustrated in FIGS. 1 and 2 respectively. These configurations are well known in spacecraft 12 design. Deployable components 18 are protected by cargo doors 20 when in the stowed configuration 14 such that they are protected during launch and early orbit operations of the spacecraft 12. Once a proper orbit has been achieved, the cargo doors 20 are opened and the deployable components 18, such as solar arrays 22, are deployed. Although a wide variety of differing deployable components 18 can be utilized by the spacecraft 12, one common component is the radiator assembly 10.

Figure 3:
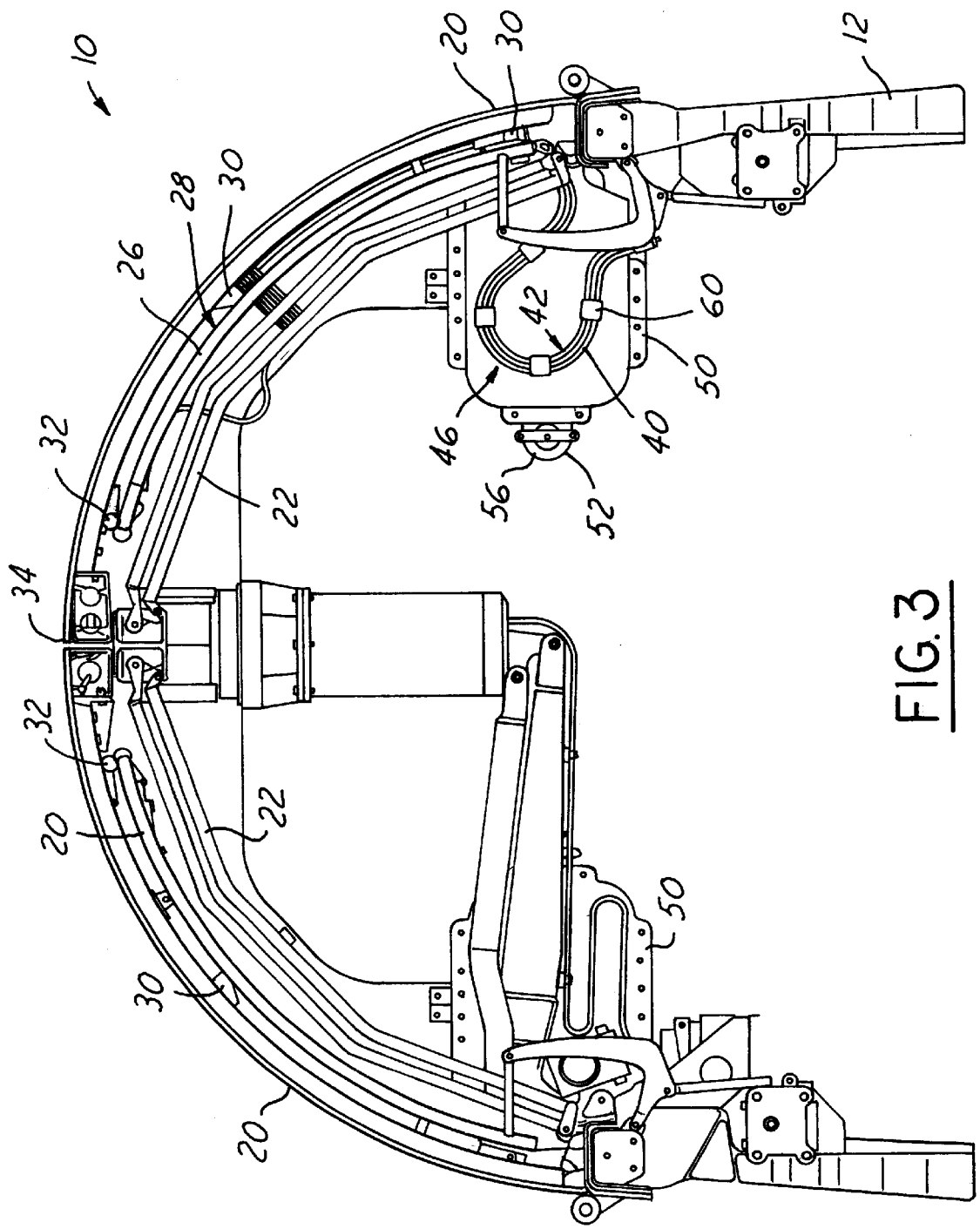
FIG. 3 is a cross-sectional illustration of the spacecraft illustrated in FIG. 1, the cross-sectional illustration showing the radiator assembly and protective doors in accordance with the present invention, the radiator assembly and protective doors shown illustrated in the stowed position.

The present invention provides a re-stowable radiator assembly 10 that allows for reliable, low-torque, high and low pressurized line compatible deployment and re-stowage. In doing so, the present invention includes a variety of novel features. FIG. 3 is a cross section illustration of the spacecraft 12 in the stowed configuration 14. As shown, the radiator assembly 10 includes at least one radiator panel assembly 26. In the illustrated embodiment, two radiator assemblies 26 are shown paired with each of the cargo doors 20. The radiator panel assemblies 26 are shown in a panel stowed position 28 in which they are located adjacent to the cargo doors 20. This allows the radiator panel assemblies 26 to be passively secured when stowed by securing them between the cargo doors 20 and the solar array 22. The radiator panel assemblies 26, therefore, adopt a low profile arrangement within the spacecraft 12 while stowed. The small space requirement the radiator panel assemblies 26 require is highly beneficial in spacecraft design. In addition, since active securing devices are not required to secure the radiator panel assemblies 26, the weight of the spacecraft 12 can be reduced. Finally, snubber elements 30 may be positioned on any or all of the cargo doors 20, the solar array 22, or the radiator panel assemblies 26 in order to further secure the radiator panel assemblies 26 during stowage. Snubber elements 30 are simply bumpers and are known to come in a wide variety of shapes and are made from a wide variety of materials.

Figure 4B:
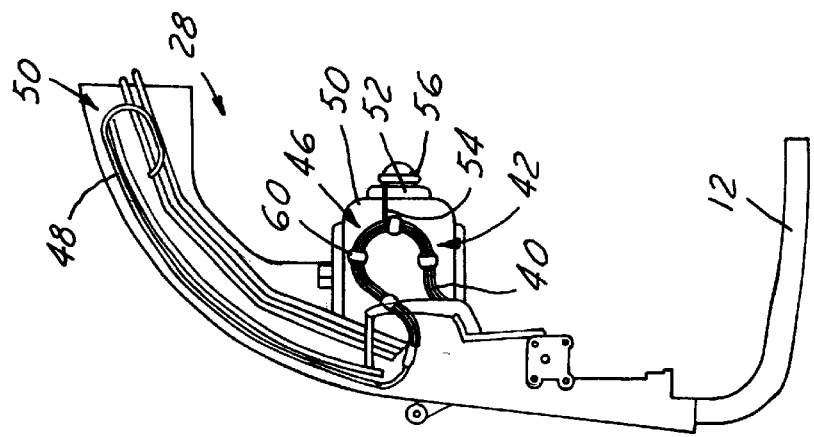
FIG. 4B is a detailed illustration of an embodiment of a radiator assembly and protective door in accordance with the present invention, the radiator assembly and protective door illustrated in the stowed position.
Figure 4A:
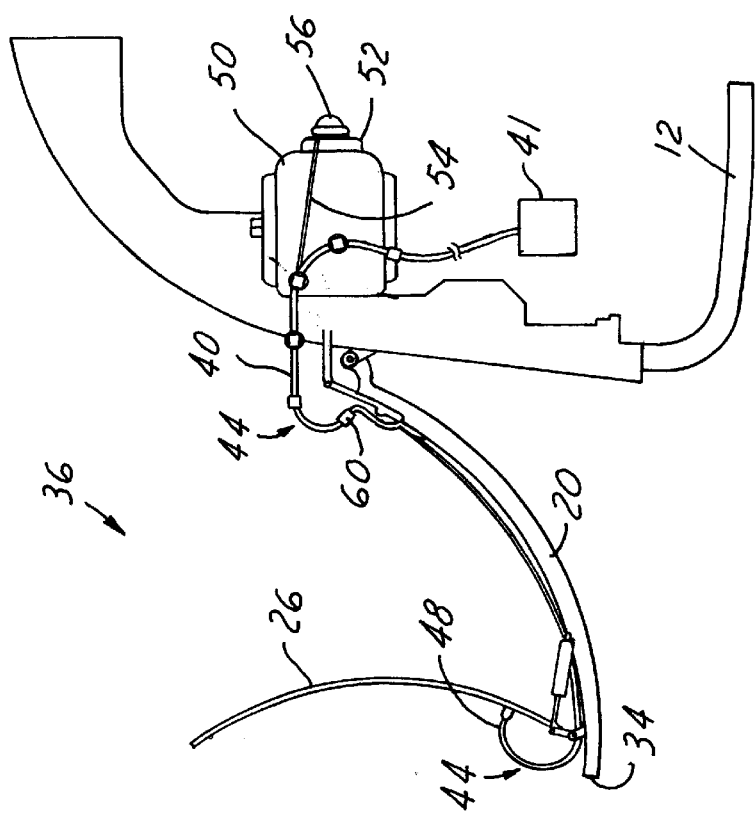
FIG. 4A is a detailed illustration of an embodiment of a radiator assembly and protective door in accordance with the present invention, the radiator assembly and protective door illustrated in the deployed position.

The radiator assembly 10 also includes at least one hinge element 32 connecting the radiator panel assembly 26 to the cargo door 20. The at least one hinge element 32 is preferably positioned in close proximity to the cargo door opening edge 34 such that the radiator panel assembly 26 can be easily rotated away from the cargo door 20 during deployment and thereby maximize exposure of the radiator panel assembly 26 to space. FIG. 4A illustrates the radiator panel assembly 26 in a panel deployed position 36. In one embodiment, the radiator panel assembly 26 is formed in a shape congruent with the inside of the cargo doors 20 such that it is easily moved from the panel deployed position 36 back into the panel stowed position 28 flush with the cargo doors 20. This severs not only to conserve usable space within the spacecraft 12, but also serves to minimize the number of required mechanisms employed to deploy and stow the radiator panel assembly 26 and therefore helps provide a reliable and efficient transition between the panel stowed position 28 and the panel deployed position 36.

An instrumental element in prior deployable radiator designs has been the use of flexible lines 40 to provide fluid communication between the spacecraft 12 and the radiator panel assembly 26 when deployed. Fluid communication is often the fundamental approach to transferring heat from the heat acquisition system 41 (see FIG. 4A) to the panels for heat rejection into space. Prior art configurations have often suffered from the inability to handle re-stowage, high pressure flow, or low torque activation requirements. The flexible lines 40 in the present invention overcome these disadvantages by forming a stowage loop 42 (see FIG. 3) when the radiator panel assembly 26 is in the panel stowed position 28. The stowage loop 42 provides the excess flexible line 40 that allows the radiator panel assembly 26 to be moved easily into the panel deployed position 36. As the radiator panel assembly 26 moves into the panel deployed position 36, the stowage loop 42 forms a flattened deployed loop 44 (see FIG. 4A). When re-stowage is required, the flexible lines 40 reform into the stowage loop 42 as the radiator panel assembly 26 moves back into the panel stowage position 28 (see FIG. 4B). The fact that the flexible line 40 is repeatably movable between the stowage loop 42 and the flattened deployed loop 44 allows the radiator panel assembly 26 to be repeatably stowed and deployed with improved reliability and with relatively low torque.

The stowage loop 42 may take on a variety of shapes and configurations. In one embodiment, it is contemplated that the stowage loop 42 may be formed in an omega loop configuration 46. It should be noted that the term omega loop 46 simply refers to the approximate shape of the flexible line 40 during storage. In alternate embodiments, however, the stowage loop 42 may be formed in other shapes. In addition, the flexible line 40 and its stowage loop 42 and flattened deployed loop 44 may be utilized anywhere within the radiator assembly 10 where such repeatable dual position flexibility is required. For example, FIGS. 4A and 4B illustrate the use of a secondary stowage loop 48 connecting the radiator panel assembly 26 to the cargo doors 20. The shape of the secondary stowage loop 48 is illustrated in a half-omega loop 50 when stowed (FIG. 4B) and similarly takes on a flattened deployed loop 44 shape when deployed (FIG. 4A). In addition to the shape of the flexible lines 40 during stowage and deployment, the flexible lines 40 may be varied by utilizing a variety of known materials. Although a variety of known materials may be utilized to provide the structural integrity to the flexible lines 40 to withstand repeated stowage and deployment, one embodiment utilizes helical wound bellows style lines. Helical wound bellows style lines are well known within the aircraft industry and are often used for airplane hydraulics. These lines provide a capability of withstanding axial loads while providing multiple cycle usage. Although an example of a material for the flexible lines 40 has been disclosed, it should be understood that a wide variety of materials and formulations for the flexible lines 40 are contemplated. Finally, it should be understood that the flexible lines 40 may consist of anywhere from a single pair of lines to a plurality of lines.

In addition to the shape and materials used to form the flexible lines 40, it is contemplated that the radiator assembly 10 may further include a variety of additional components utilized to facilitate the flexible line 40 moving repeatably between a stowage loop 42 and the flattened deployed loop 44. One such component is a stowage box 50 illustrated in FIGS. 4A and 4B. The stowage box 50 is utilized to minimize twist and out of plane movement of the flexible line 40 as it moves between the stowage loop 42 and the flattened deployed loop 44 by restraining movement of the flexible line 40 into a single plane. In addition, the stowage box 50 contains and isolates the line assembly 40 from high bending loads associated with launch and landing. By isolating the flexible lines 40, they are kept out of contact with other parts of the spacecraft 12 during launch and recovery and thereby protected from damage. Thus the use of the stowage box 50 provides for a more resilient radiator assembly 10 that may be applicable in a variety of spacecraft 12 designs.

The radiator assembly 10 may further include a tensioning assembly 52. The tensioning assembly 52 affixes to a point on the flexible line 40 and exerts a force on the flexible line 40 such that when the radiator panel assembly 26 is moved from the panel deployed position 36 (FIG. 4A) to the panel stowage position 28 (FIG. 4B), the flexible line 40 is naturally forced from the flattened deployed loop 44 configuration into the stowage loop 42 configuration. Although it is contemplated that the tensioning assembly 52 may be formed in a variety of fashions, in one embodiment the tensioning assembly 52 consists of a constant force retraction/tensioning spring device. More specifically, in another embodiment the tensioning assembly 52 includes a cable 54 attached at one end to the flexible line 40 and at the other to a spring wound device 56. It should be understood that a wide variety of tensioning assemblies 52 would be obvious to one skilled in the art.

Figure 5:
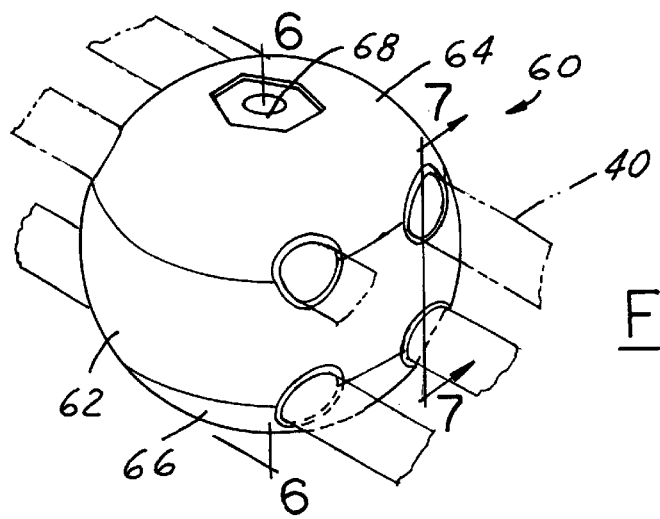
FIG. 5 is a detailed illustration of a spreader block for use with a radiator assembly in accordance with the present invention.
Figure 6:
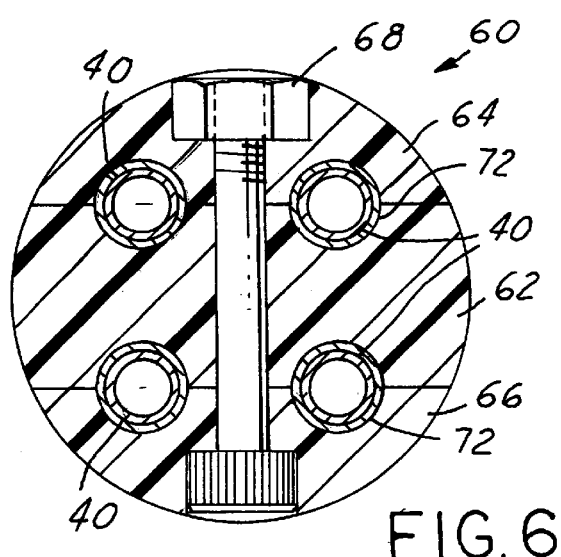
FIG. 6 is a cross-sectional illustration of the spreader block illustrated in FIG. 5, the cross-section taken along the lines 6—6 in the direction of the arrows.

The radiator assembly 10 may further include one or more spreader blocks 60 (see FIG. 5). The spreader blocks 60 can be utilized to keep multiple flexible lines 40 from contact with one another during movement. In addition, the spreader blocks 60 can help insure the flexible lines 40 move as a cohesive unit and therefore may be useful in insuring the flexible lines 40 move between the flattened deployed loop 44 configuration and the stowage loop 42 configuration reliably. The present invention contemplates the use of a unique spreader block design illustrated in FIGS. 5–7. The spreader block 60 includes a center section 62, a cap section 64 and a base section 66. This allows the spreader block 60 to be secured utilizing a retaining bolt 68 around the flexible lines 40 at any point of assembly. The spreader block 60 can be formed in a variety of shapes from a variety of materials. In one embodiment, the spreader block 60 is formed using nylon and is shaped in a spherical pattern. This reduces heat transfer between the flexible lines 40 passing through the spreader block 60 and the spherical shape minimizes the spreader block 60 catching on and mechanical components during deployment 16 or stowage 14. In a similar fashion, the spreader block 60 may be coated with Teflon or other low-friction coating to further facilitate movement in and out of the stowage box 50.

Figure 7:
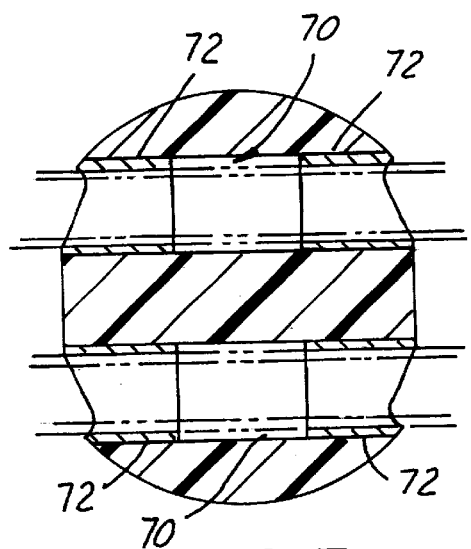
FIG. 7 is a cross-sectional illustration of the spreader block illustrated in FIG. 5, the cross-section taken along the lines 7—7 in the direction of the arrows.

In addition to the materials utilized to form the spreader block 60, additional design advances are utilized by the present invention to reduce heat transfer between the flexible lines 40. As illustrated in FIG. 7, the spreader block 60 can be formed to create an insulation gap 70 between the spreader block 60 material and the flexible lines 40 passing through it. This further reduces heat flow between flexible lines 40. Although the insulation gap 70 may be created in a variety of fashions, one embodiment contemplates the use of a non-continuous liner 72 positioned within the spreader block 60. The non-continuous liner 72 can act as clamping agent to secure the flexible lines 40 within the spreader block 60. In addition, where the non-continuous liner 72 is absent, the insulation gap 70 is naturally formed.

Figure 8:
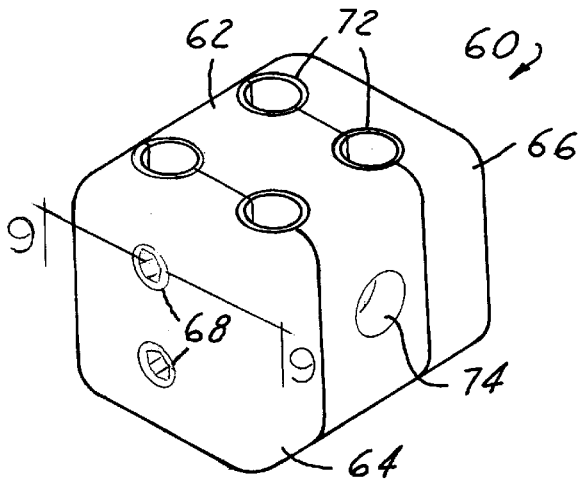
FIG. 8 is a detailed illustration of a spreader block for use with a radiator assembly in accordance with the present invention.
Figure 9:
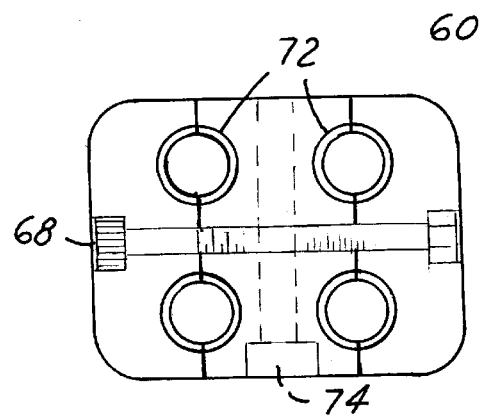
FIG. 9 is a side view illustration of the spreader block illustrated in FIG. 8, the cross-section taken along the lines 9—9 in the direction of the arrows.

Although the spreader block has been described in a particular shape and form, it should be understood that a wide variety of spreader block 60 designs are contemplated by the present invention. Spreader block 60 design may be configured based upon the specific application and location of the block. For example, the spreader block 60 designs illustrated in FIGS. 5–7 have been optimized for use on a portion of the flexible lines 40 that translate during operation. Other locations of spreader block 60 design may have different priorities such as affixing portions of the flexible line 40 to a permanent structure. One such embodiment is illustrated in FIGS. 8 and 9. The squared off spreader block 60 is well suited for affixing the flexible lines 40 to a permanent location. The spreader block 60 in this design can include an additional mounting bore 74 to simplify the bolting of the spreader block 60 to an outside structure.

While particular embodiments of the invention have been shown and described, numerous variations and alternative embodiments will occur to those skilled in the art. Accordingly, it is intended that the invention be limited only in terms of the appended claims.

What is claimed is:

1. A radiator assembly for use on a spacecraft comprising:
   at least on radiator panel assembly repeatably movable between a panel stowed position and a panel deployed position;
   at least two flexible lines in fluid communication with said at least one radiator panel assembly, said at least two flexible lines repeatably movable between a stowage loop configuration and a flattened deployed loop configuration.

2. A radiator assembly as described in claim 1 wherein said stowage loop configuration is an omega loop shape.

3. A radiator assembly as described in claim 1 wherein said stowage loop configuration is a half-omega loop shape.

4. A radiator assembly as described in claim 1 further comprising:
   at least one stowage box housing said at least two flexible lines when in said stowage loop configuration, said at least one stowage box limiting out of plane movement of said at least two flexible lines.

5. A radiator assembly as described in claim 1 further comprising:
   a tensioning assembly in communication with said at least two flexible lines, said tensioning assembly assisting the reformation of said stowage loop configuration from said flattened deployed loop configuration when said radiator panel assembly moves from said panel deployed position to said panel stowed position.

6. A radiator assembly as described in claim 5 wherein said tensioning assembly comprises:
   a cable element having a first end attached to said at least two flexible lines and a second end attached to a spring wound device.

7. A radiator assembly as described in claim 1 wherein said at least two flexible lines comprises a plurality of flexible lines.

8. A radiator assembly as described in claim 7 further comprising:
   at least one spreader block attached to said plurality of flexible lines.

9. A radiator assembly as described in claim 8 wherein said at least one spreader block is spherically shaped.

10. A radiator assembly as described in claim 8 wherein said at least one spreader block is formed using nylon.

11. A radiator assembly as described in claim 1 wherein said at least two flexible lines are formed using helical wound bellows line.

12. A radiator assembly as described in claim 1 wherein said at least one spreader block creates a least one insulation gap between said at least two flexible lines.

13. A radiator assembly as described in claim 1 wherein said at least one radiator panel assembly is positioned adjacent a cargo door on the spacecraft while said at least one radiator panel assembly is in said panel stowed position.

14. A radiator assembly as described in claim 13 wherein said at least one radiator panel assembly passively secured between a cargo door and a solar array on the spacecraft while said at least one radiator panel assembly is in said panel stowed position.

15. A radiator assembly as described in claim 14 wherein said at least one radiator panel assembly is additionally secured using at least one snubber element.

16. A radiator assembly for use on a spacecraft having at least one cargo door comprising:
   at least on radiator panel assembly repeatably movable between a panel stowed position and a panel deployed position, said at least one radiator panel assembly positioned adjacent the cargo door on the spacecraft while said at least one radiator panel assembly is in said panel stowed position.

17. A radiator assembly as described in claim 16 wherein said at least one radiator panel assembly is passively secured between the cargo door and a solar array on the spacecraft while said at least one radiator panel assembly is in said panel stowed position.

18. A radiator assembly as described in claim 17 wherein said at least one radiator panel assembly is additionally secured using at least one snubber element.

19. A radiator assembly as described in claim 16 wherein said at least one radiator panel assembly is shaped congruent with the cargo door such that said at least one radiator assembly remains congruent with the cargo door when in said panel stowed position.

20. A radiator assembly as described in claim 16 further comprising:
   at least one hinge element rotatably attaching said at least one radiator panel assembly to the cargo door, said at least one hinge element positioned adjacent an opening edge of the cargo door.

21. A radiator assembly as described in claim 18 further comprising:
   at least two flexible lines in fluid communication with said at least one radiator panel assembly, said at least two flexible lines repeatably movable between a stowage loop configuration and a flattened deployed loop configuration.

22. A radiator assembly as described in claim 21 further comprising:
   a tensioning assembly in communication with said at least two flexible lines, said tensioning assembly assisting the reformation of said stowage loop configuration from said flattened deployed loop configuration when said radiator panel assembly moves from said panel deployed position to said panel stowed position.

23. A radiator assembly as described in claim 22 wherein said tensioning assembly comprises a constant force retraction spring assembly.

24. A radiator assembly for use on a spacecraft comprising:
   at least on radiator panel assembly repeatably movable between a panel stowed position and a panel deployed position;
   at least two flexible lines in fluid communication with said at least one radiator panel assembly, said at least two flexible lines repeatably movable between a stowage loop configuration and a flattened deployed loop configuration; and
   a stowage box housing said at least two flexible lines when said at least two flexible lines are in said stowage loop configuration, wherein said stowage box protects said at least two flexible lines from high bending load associated with launch and landing.

25. A radiator assembly for use on a spacecraft comprising:
   at least on radiator panel assembly repeatably movable between a panel stowed position and a panel deployed position;
   at least two flexible lines in fluid communication with said at least one radiator panel assembly, said at least two flexible lines repeatably movable between a stowage loop configuration and a flattened deployed loop configuration; and
   at least one spreader block attached to said at least two flexible lines, said at least one spreader block forming an insulation gap reducing thermal communication between said at least two flexible lines.

26. A radiator assembly as described in claim 25 wherein said at least one spreader block is spherical in shape.

27. A radiator assembly as described in claim 25 wherein said at least one spreader block is formed using nylon.

28. A radiator assembly as described in claim 25 wherein said insulation gap is formed using a non-continuous liner.

* * * * *

UNITED STATES PATENT AND TRADEMARK OFFICE
CERTIFICATE OF CORRECTION

PATENT NO. : 6,595,470 B2
DATED : July 22, 2003
INVENTOR(S) : Bryan V. Keeler et al.

It is certified that error appears in the above-identified patent and that said Letters Patent is hereby corrected as shown below:

<u>Column 8,</u>
Line 15, should read as follows:
-- at least one radiator panel assembly repeatably movable --

Signed and Sealed this

Tenth Day of February, 2004

JON W. DUDAS
*Acting Director of the United States Patent and Trademark Office*